United States Patent [19]

Sugihara et al.

[11] Patent Number: 5,256,734

[45] Date of Patent: Oct. 26, 1993

[54] POLYPROPYLENE RESIN COMPOSITION AND METHOD FOR MANUFACTURING COATED MOLDED ARTICLE OF THE RESIN COMPOSITION

[75] Inventors: Eiichi Sugihara; Keigo Suehiro; Katsumi Sekiguchi; Minoru Hoshino, all of Kanagawa, Japan

[73] Assignee: Mitsui Toatsu Chemicals, Inc., Tokyo, Japan

[21] Appl. No.: 833,755

[22] Filed: Feb. 11, 1992

[30] Foreign Application Priority Data

Feb. 15, 1991 [JP] Japan .................. 3-021956

[51] Int. Cl.$^5$ .............. C08L 53/02; C08L 9/06; C08L 23/12
[52] U.S. Cl. ...................... 525/98; 525/89; 525/95; 525/240
[58] Field of Search .......... 525/98, 240, 89, 95; 264/129

[56] References Cited

U.S. PATENT DOCUMENTS 4,687,804 8/1987 Shiraishi et al. .
5,026,752 6/1991 Wakabayashi et al. ............. 525/98

FOREIGN PATENT DOCUMENTS 165662 12/1985 European Pat. Off. .
241667 10/1987 European Pat. Off. .
58-206644 12/1983 Japan .
61-14248 1/1986 Japan .
3-277636 12/1991 Japan .
2176790 1/1987 United Kingdom .

OTHER PUBLICATIONS

WIPL, AN 82-48939E & JP-A-57073034 *Abstract*.

*Primary Examiner*—James J. Seidleck
*Assistant Examiner*—W. R. H. Clark
*Attorney, Agent, or Firm*—Burns, Doane, Swecker & Mathis

[57] ABSTRACT

A resin composition is herein provided which comprises 100 parts by weight of a polypropylene and 20 to 100 parts by weight of a hydrogenated styrene/butadiene or styrene/isoprene elastomeric block copolymer having a melt index of not less than 25 g/10 min as determined at a temperature of 230° C. and a load of 2.16 kg/cm$^2$. A method for manufacturing a coated molded article of the resin composition is herein provided and the method comprises the steps of molding said resin composition and then applying a coating directly without any preliminary surface treatment. This method can provide a molded article having low mold shrinkage factor and linear expansion coefficient, makes it possible to reduce the amount of fillers to be incorporated and is thus effective for making the weight of automobiles lighter.

8 Claims, No Drawings

POLYPROPYLENE RESIN COMPOSITION AND METHOD FOR MANUFACTURING COATED MOLDED ARTICLE OF THE RESIN COMPOSITION

BACKGROUND OF THE INVENTION (a) Field of the Invention

The present invention relates to a polypropylene resin composition, the molded article of the resin composition having excellent adhesion to paints or varnishes without any treatment after molding such as an etching treatment with vapor of an organic solvent, e.g., trichloroethane, a plasma treatment and a flame treatment for oxidizing the surface thereof, as well as a method for the manufacturing a coated molded article of the resin composition.

(b) Description of the Prior Art

Metal materials for external plate materials such as bumpers and fenders for automobiles have increasingly been superseded by polypropylene resin compositions. However, regarding the coating of the molded articles of polypropylenes, they must usually be coated after subjecting it to an appropriate pretreatment since polypropylene per se has extremely low coating properties. As such pretreatments, there have long been used, for instance, an etching treatment with vapor of an organic solvent such as trichloroethane (1,1,1-trichloroethane), a plasma treatment and a flame treatment for oxidizing the surface thereof. In case of large size molded articles such as bumpers for automobiles, the optimum method for coating the same comprises pretreating the surface of the articles, in particular, etching the surface with vapor of trichloroethane, then applying a primer layer containing, for instance, a chlorinated polyolefin in advance, drying it by heating, applying a paint or varnish (hereinafter simply referred to as "paint(s)") and then heating to harden the coated paint layer since the method requires the use of a simple apparatus and allows the curtailment of the coating expenses. Incidentally, highly volatile, chemically stable chlorine atom-containing compounds such as trichloroethane are hardly decomposed after being released in the air and if they diffuse to the ozone layer surrounding the earth, ozone which serves to absorb ultraviolet rays or the like emitted by the sun would be severely decomposed. Accordingly, it has been believed that the decomposition of ozone possibly leads to an increase in the quantity of harmful ultraviolet rays or the like which are pouring on the ground and that the frequency of developing diseases such as cutaneous cancer would, in turn, be increased. With these points as background, it has been required for the reduction of the amount of chlorine atom-containing organic solvents such as trichloroethane on a worldwise scale and the use thereof must be wholly abolished in the near future. For instance, in the 2nd Meeting for the Agreement of Montreal Protocol held on June, 1990, it has been decided that the use and preparation of trichloroethane should be wholly abolished by 2005 and accordingly the use and preparation thereof have stepwise been reduced until the deadline. For this reason, trichloroethane can no longer be used in the pretreatment of large size molded articles such as bumpers for automobiles. However, if other pretreatments in which trichloroethane is not used, for instance, the plasma treatment is employed instead, it is necessary to built a big installation for treating large-size molded articles such as bumpers for automobiles and too much expenses are in turn required. On the other hand, when a combustible resin is subjected to a flame treatment, various problems arise. For instance, thin portions or the like thereof may be molten and may begin to burn. Therefore, the yield of coated article is substantially impaired. Further, the size of the oxidizing flame for oxidizing the surface of polypropylene cannot be increased too much. If a material to be treated has a complicated shape, a part thereof is incompletely treated and this leads to the formation of portions having extremely low adhesion to a coating film subsequently applied thereto. Thus, the flame treatment can only be applied to materials having approximately flat and simple shapes.

On the other hand, there has been proposed the use of block copolymers of styrene and conjugated dienes or hydrogenated derivatives thereof as impact modifiers for styrene resins and polyolefinic resins (see, for instance, Japanese Unexamined Patent Publication (hereinafter referred to as "J. P. KOKAI") Nos. Sho 58-215446, Sho 60 133039, Sho 61-014248 and Hei 1-174550). However, currently used styrene/butadiene block copolymers, styrene/isoprene copolymers or hydrogenated derivatives thereof have high viscosities and, therefore, if they are mechanically kneaded together with polypropylene and then injection-molded, the rubber component is present in the superficial polypropylene layer of the resulting molded article in approximately spherical shape. For this reason, the incorporation of these rubber components does not contribute to the improvement in the coating properties even if a solvent included in a paint penetrates into the superficial portion of the article because the surface area of the rubber layer on the article is not so large. Furthermore, it has bad flowability, results in flow marks and/or jetting on injection molding and the molded articles have low surface gloss. Moreover, J. P. KOKAI No. Hei 3-277636 discloses a composition which comprises a polypropylene and a hydrogenated styrene/isoprene block copolymer or comprises a styrene/butadiene block copolymer, talc and a hydrogenated product of a diene polymer having terminal hydroxyl groups. The composition can provide a molded article which has excellent coating properties without treatment with trichloroethane vapor and to which a paint can directly be applied. The patent further discloses that the hydrogenated styrene/isoprene block copolymer or the styrene/butadiene block copolymer should have a melt index of not more than 20 g/10 min as determined at a temperature of 230° C. and a load of 2.16 kg/cm$^2$ for obtaining improved coating properties and low temperature impact resistance.

On the other hand, the environmental pollution due to the exhaust gas released from automobiles has become a problem in the United States and Europe. Accordingly, as one of the measures therefor, it would be institutionalized, in the United States, that the automobiles must be made lighter and the combustion efficiency is further improved to thus reduce the amount of exhaust gas released in the air. To this end, it has been desired that the specific gravity of polypropylene resin compositions or the like used in various parts of automobiles should be reduced to a level of several percents lower than that of the conventional materials. A preferred means for making, lighter, the bumpers or the like, which comprise fillers such as talc in an amount ranging from about 5 to 20%, for automobiles is to reduce the amounts of fillers having specific gravities greater than that of resins. However, if the amounts of fillers are reduced, the mold shrinkage factor and linear expansion coefficient of the resulting resin compositions are greater than those of the conventional materials containing sufficient amounts of fillers and thus the resulting materials are not suitable for use in making large size molded articles.

SUMMARY OF THE INVENTION

One object of the present invention is to provide a polypropylene resin composition whose filler content is substantially reduced and which still maintains excellent mold shrinkage factor and linear expansion coefficient comparable to those of the conventional molding materials containing fillers, the molded article having excellent adhesion to paint layers subsequently applied thereto without any treatment after molding such as an etching treatment with an organic solvent such as trichloroethane, a plasma treatment or a flame treatment for oxidizing the surface of the molded article.

Another object of the present invention is to provide a method for manufacturing a coated molded article of the resin composition.

According to the present invention, there is thus provided a resin composition which comprises 100 parts by weight of a polypropylene and 20 to 100 parts by weight of a hydrogenated styrene/butadiene or styrene/isoprene elastomeric block copolymer having a melt index of not less than 25 g/10 min as determined at a temperature of 230° C. and a load of 2.16 kg/cm$^2$.

According to the present invention, there is further provided a method for manufacturing a coated molded article which comprises the steps of molding a resin composition comprising 100 parts by weight of a polypropylene and 20 to 100 parts by weight of a hydrogenated styrene/butadiene or styrene/isoprene elastomeric block copolymer having a melt index of not less than 25 g/10 min as determined at a temperature of 230° C. and a load of 2.16 kg/cm$^2$ and then applying a coating directly without any preliminary surface treatment.

DETAILED DESCRIPTION OF THE INVENTION

Polypropylenes which may be used in the present invention include, for instance, homopolypropylene and copolymers of propylene with olefins such as ethylene with the homopolypropylene being particularly preferred because of high rigidity, heat resistance and surface gloss. On the other hand, ethylene/propylene block copolymers are excellent in impact resistance and, therefore, they can optionally be used. More specifically, a part or whole of the homopolypropylene may be replaced with such ethylene/propylene block copolymer. Moreover, it is also possible to incorporate, into the resin composition, other resins such as a high density polyethylene, a low density polyethylene, a linear low density polyethylene, and/or a polybutene in addition to the polypropylene for controlling various properties such as impact strength, mold shrinkage factor, linear expansion coefficient, surface hardness and/or rigidity of the resulting composition or a molded article.

The hydrogenated styrene/butadiene or styrene/isoprene elastomeric block copolymers are elastomers such as diblock copolymers (St-Is, St-Bu) of styrene (St) and isoprene (Is) or butadiene (Bu) and triblock copolymers (St-Is-St, St-Bu-St) of these monomers which are hydrogenated so as to principally hydrogenate the unsaturated double bonds of the isoprene and butadiene blocks. In this respect, if the styrene content is fixed to a constant level, the triblock copolymers are preferred because of excellent rigidity and heat resistance. These rubber components should have a melt index of 25 g/10 min or higher, as determined at 230° C. and a load of 2.16 kg/cm$^2$ and in particular they are preferably selected so that the melt index thereof is at least two times that of the polypropylene used. When such a rubber component or elastomer having a melt index of not less than 25 g/10 min is incorporated into the polypropylene and then formed into a molded article through, for instance, injection molding, the elastomer is arranged in the form of fibers or layers parallel to the flow direction of the starting resin composition during molding in the superficial portion of the article and serves to reduce the mold shrinkage factor and linear expansion coefficient of the article. Thus, the use of such an elastomer makes the amount of fillers such as talc to be used smaller to, in turn, make the article lighter. Moreover, such orientation of the elastomer in the form of fibers or layers parallel to the flow direction in the superficial portion of the article leads to an increase in the surface area of the elastomer which comes in contact with a solvent included in a primer layer or a paint subsequently applied thereto. Accordingly, the resulting article has excellent adhesion to coated films and high durability after coating. Therefore, it is not necessary to further incorporate a polymer carrying hydroxyl groups such as those disclosed in J. P. KOKAI No. Hei 3-2776361.

The content of styrene moiety in the foregoing hydrogenated styrene/butadiene or styrene/isoprene elastomeric block copolymer preferably ranges from 10 to 40% by weight. This is because, if it is less than 10% by weight, the resulting molded article is insufficient in adhesion to paints and heat resistance, while if it exceeds 40% by weight, the resulting article is insufficient in impact strength, in particular low temperature impact strength.

The amount of the foregoing hydrogenated styrene/butadiene or styrene/isoprene elastomeric block copolymer to be incorporated into the resin composition ranges from 20 to 100 parts by weight, preferably 20 to 80 parts by weight and more preferably 23 to 50 parts by weight per 100 parts by weight of the polypropylene. This is because if it is less than 20 parts by weight, the resulting molded article does not exhibit sufficient adhesion to coated films, while if it exceeds 100 parts by weight, the heat resistance of the resulting resin composition is extremely low and hence the molded article sometimes causes deformation when it is coated with a paint and then dried by heating.

The resin composition used in the invention may further comprise an appropriate amount of elastomers other than the foregoing hydrogenated styrene/butadiene or styrene/isoprene elastomeric block copolymer having a melt index of not less than 25 g/10 min for the purpose of improving various properties such as rigidity, impact strength, mold shrinkage factor and linear expansion coefficient of the resulting resin composition or molded article. Examples of such other elastomers include butadiene rubbers, isoprene rubbers, chloroprene rubbers, very low density polyethylenes, ethylene-propylene-diene copolymeric rubbers, butyl rubbers, acryl rubbers, tetrafluoroethylene perfluoromethyl ether elastomers, fluorosilicone elastomers, epichlorohydrin elastomers, vulcanized elastomers, ethylenepropylene copolymeric rubbers, ethylene butene copolymeric elastomers, styrene-butadiene diblock copolymeric elastomers, styrene-butadiene triblock copolymeric elastomers, styrene-isoprene diblock copolymeric elastomers and styrene-isoprene triblock copolymeric elastomers.

The foregoing resin composition may further comprise optional fillers for the improvement in properties such as rigidity, mold shrinkage factor and linear expansion coefficient. In particular, the polypropylene resin composition used in the invention can provide a molded article having mold shrinkage factor and linear expansion coefficient comparable to those of the conventional polypropylene resin compositions although the composition comprises fillers in an amount smaller than that for the conventional composition. Thus, the article can be made lighter. In the present invention, it is preferable to use the filler in an amount of 2 to 35% by weight on the basis of a total weight of the resin composition.

Examples of fillers usable in the invention are metal powder, carbon black, graphite, carbon fibers, silica, alumina, titanium oxide, iron oxide, zinc oxide, magnesium oxide, tin oxide, antimony oxide, barium ferrite, strontium ferrite, aluminum hydroxide, magnesium hydroxide, calcium sulfate, barium sulfate, talc, clay, mica, calcium silicate, glass fibers, calcium titanate, aluminum nitride, silicon carbide and cadmium sulfide. In particular, plate-like fillers such as talc can provide a resin composition having a small difference between mold shrinkage factors or linear expansion coefficients in the longitudinal and lateral directions with respect to the flow direction during injection-molding of the resin. In addition, fibrous fillers such as magnesium sulfate whiskers, potassium titanate and glass fibers can provide a resin composition having particularly low mold shrinkage factor and linear expansion coefficient in the flow direction during injection-molding the resin as well as rigidity higher than that achieved by the addition of talc or the like.

The optimum kinds and amounts of fillers to be incorporated are selected depending on the shapes and specific gravities of fillers as well as desired mold shrinkage factors and linear expansion coefficients. For instance, if the resin composition comprises talc as a filler, the composition used in the invention allows the reduction of the content of talc to 9/10 to 6/10 time that for the conventional resin composition (the talc content thereof ranges from 3 to 40% by weight) without causing any significant reduction in the mold shrinkage factor and linear expansion coefficient and, as a result, the weight of the resulting molded article can be reduced by 1 to 5% by weight as compared with those obtained from the conventional resin composition while maintaining the mold shrinkage factor and linear expansion coefficient almost comparable to those of the conventional article. Moreover, the reduction of the amount of the filler leads to an increase in the impact strength of the resulting molded article and accordingly, practically acceptable impact strength can be obtained even if the resin composition used comprises a hydrogenated styrene-butadiene or styrene-isoprene block copolymer having a melt index of not less than 25 g/10 min as determined at 230° C. and a load of 2.16 kg/cm$^2$. In particular, if the resin composition comprises a filler in an amount 20 to 40% by weight smaller than that of the conventional one and the composition comprises a hydrogenated styrene-butadiene or styrene-isoprene block copolymer having a melt index ranging from 25 to 50 g/10 min, the resulting resin composition exhibits impact strength comparable to that of the composition whose filler content is not changed and which comprises the same amount of a hydrogenated styrene-butadiene or styrene isoprene block copolymer having a melt index ranging from 0.5 to 3 g/10 min.

When a high impact resistance-grade article such as a bumper for use in automobiles is produced according to the conventional method, those having an Izod impact strength of 5 kg·cm/cm as determined at −30° C. and a mold shrinkage factor of about 8/1000 are obtained from a conventional composition: PP/EPR/talc (=60/30/10), but according to the present invention, such articles can be obtained from a composition: PP/rubber/talc (=64/30/6). Further, when a high rigidity-grade article such as an interior material or fender for use in automobiles is produced according to the conventional method, those having an Izod impact strength at ordinary temperature of 20 kg·cm/cm as determined at −30° C. and a mold shrinkage factor of about 6/1000 are obtained from a conventional composition: PP/EPR/talc (=70/10/20), but according to the present invention, such articles can be obtained from a composition: PP/rubber/talc (=76/10/14).

The resin composition may further comprise optional additives in addition to the foregoing resin components. Examples of such additives include antioxidants, dispersants, ultraviolet absorbers, antistatic agents, pigments, dyes, crystallization accelerators, lubricants, flame retardants and plasticizers.

The polypropylene resin composition used in the present invention can be, like the usual polypropylene resin compositions, mixed by a blender or mixer such as a ribbon blender, a Henschel mixer, then molten and kneaded in an apparatus such as a Banbury mixer, heated rollers, an extruder or Ko-kneader for forming it into pellets, extruded into a sheet with an extruder and formed into a desired shape by a means such as vacuum molding, pressure forming, vacuum-pressure molding or press molding; or blow molding or injection molding.

In the method according to the present invention, the foregoing molded article may be coated with a paint directly or after lightly washing and degreasing. In other words, the molded article of the present invention has sufficient adhesion to coated films without any pretreatment such as an etching treatment with vapor of an organic solvent such as trichloroethane, a plasma treatment for oxidizing the surface thereof or a flame treatment which causes various problems such as those discussed above. The washing degreasing can be performed by immersing the article in a liquid such as an alcohol, e.g., methanol, ethanol or isopropyl alcohol; an aqueous solution of an acid, e.g., hydrochloric acid, sulfuric acid or nitric acid; an aqueous or alcoholic solution of an alkali, e.g., sodium hydroxide, potassium hydroxide, calcium hydroxide, sodium carbonate or calcium carbonate; or an aqueous or alcoholic solution of a surfactant, e.g., a neutral or weak alkali detergent at ordinary temperature or under heating, or by spraying such a solution on the article. The article thus washed and/or degreased is then coated with a paint after optionally rinsing with distilled water, deionized water, tap water or an alcohol to remove the solution for washing degreasing, and then drying.

The method of the present invention can provide a molded article having practically acceptable adhesion to paints without applying any primer layer, but if further improvement in coating properties, for instance, resistance to gasoline is required, the article is preferably treated with a primer composition containing, for instance, a chlorinated polyolefin in advance and then coated with a paint. Thus, the application of a primer layer of a chlorinated polyolefin results in further improvement in the properties of a coated film subsequently applied such as resistance to gasoline. Examples of such chlorinated polyolefins are chlorinated polyethylene, chlorinated polypropylene and chlorinated polybutene, with the chlorinated polypropylene being particularly preferred. These chlorinated polyolefins are used in the form of a solution or emulsion. Particularly preferred examples of solvents used for forming such solutions or emulsions are those capable of partially or completely solubilizing or swelling the hydrogenated styrene/butadiene or styrene/isoprene block copolymer, such as toluene, ethyl acetate, methyl ethyl ketone and xylene. The thickness of the primer layer to be formed preferably ranges from 5 to 50 μ. Then the paint may be applied to the primer layer immediately after application of the primer, but preferably the primer layer is heated to 30° to 150° C. for 5 to 60 minutes prior to the application of a paint. This results in the formation of a primer layer having uniform thickness and stable film strength.

Examples of paints usable in the present invention include those currently used for coating polypropylene resin compositions such as alkyd, urethane, acrylic, vinylic, epoxy paints. The conditions for coating paints such as thickness of the coated film, predrying temperature and baking temperature which have been used conventionally can likewise be adopted in the present invention without any trouble. For instance, alkyd and urethane paints are preferably coated in a thickness of 20 to 50 μ, then preheated to 30° to 120° C. for 10 to 30 minutes to remove the solvent present in the paints and heated to 70° to 160° C. for 15 to 120 minutes to perform baking.

The present invention will hereinafter be explained in more detail with reference to the following non-limitative working Examples and the effects practically achieved by the invention will also be discussed in detail in comparison with Comparative Examples.

EXAMPLES 1 TO 3

"Mitsui NOBLEN JH-G" (MI 4 g/10 min; available from Mitsui Toatsu Chemicals, Inc.) as a homopolypropylene and "SEPTON 2002" (MI 30 g/10 min; styrene content 30% by weight; available from Kuraray Co., Ltd.) as a hydrogenated styrene-isoprene triblock copolymeric elastomer were combined, mixed in a Henschel mixer and then extruded through a twin screw extruder of 35 mm φ to give pellets. The resulting pellets were formed into a plate having a size of 80 mm×150 mm×2 mm using an injection molder having a clamp pressure of 100 t, a primer comprising "RB-115" (a chlorinated polypropylene primer; available from Nippon Bee Chemical Co., Ltd.) was applied onto the plate so that the thickness thereof was 20 to 50 μ, then dried by heating at 60° for 30 minutes, followed by application of a paint, "U-040" (an alkyd paint; available from Nippon Paint Co., Ltd.) in a film thickness of 40 to 80 μ and heating at 80° C. for 150 minutes. After 48 hours, checkers peeling test was performed to determine the adhesive strength of the coated film and the coated film was cut into strips of 10 mm wide to determine the peel strength thereof using a tensile machine. In addition, the coated plate was immersed in a gasoline/ethyl alcohol 90:10 (v/v) solution to determine the time required for the deformation of the film and initiation of peeling thereof, which was defined to be the resistance to gasoline. An ASTM No. 1 dumbbell specimen was formed from the pellets and the mold shrinkage factor in the longitudinal direction was determined after 24 hours. A rod having a thickness of 3 mm, a width of 25.0 mm and a length of 125 mm was formed from the pellets to determine the the linear expansion coefficient in the longitudinal direction at a rate of temperature rise of 2° C./min within the temperature range of from −40° to 120° C. Izod impact strength was determined at 23° and −30° C. in accordance with the method as defined in ASTM D-523. The heat deformation temperature was determined in accordance with the method as defined in ASTM D-648 (under a condition of 4.16 kg/cm$^2$). These properties of samples free of primer layer were likewise evaluated in the same manner. The samples free of primer layer had practically acceptable adhesive strength and peel strength, but the resistance to gasoline was slightly lower than that of the samples to which a primer layer was applied. The results obtained are summarized in Table 1.

COMPARATIVE EXAMPLE 1

The same procedures used in Example 1 were repeated except that only the homopolypropylene used in Example 1 was used to give a plate and then a paint was applied onto the plate to evaluate the foregoing various properties which were determined in the same manner. The adhesive strength, peel strength and resistance to gasoline of the resulting specimen were extremely low and practically unacceptable. Moreover, the mold shrinkage factor and linear expansion coefficient thereof were greater than those observed in Examples 1 to 3. The compounding ratio used and the results obtained in this Comparative Example 1 are summarized in Table 1.

COMPARATIVE EXAMPLE 2

The same procedures used in Example 1 were repeated except that 30% by weight of ethylene-propylene rubber (MI 30 g/10 min; propylene content 26% by weight) produced by the use of a vanadium catalyst was substituted for the hydrogenated styrene-isoprene triblock copolymer used in Example 1 to give a plate and then a paint was applied onto the plate to evaluate the foregoing various properties which were determined in the same manner. The adhesive strength, peel strength and resistance to gasoline of the resulting specimen were extremely low and practically unacceptable. These properties of the comparative sample to which a primer layer was applied were inferior to those observed for the samples free of primer layer produced in Examples 1 to 3. Moreover, the mold shrinkage factor and linear expansion coefficient thereof were greater than those observed in Examples 1 to 3. Further, the impact strength, in particular low temperature impact strength was insufficient. The compounding ratio used and the results obtained in this Comparative Example 2 are summarized in Table 1.

EXAMPLES 4 TO 6

The same procedures used in Examples 1 to 3 were repeated except that an ethylene-propylene block copolymer having a melt index of 8 g/10 min and an ethylene content of 8% by weight was partially or entirely substituted for a homopolypropylene identical with that used in Example 1 and that talc "CT-8" (available from Asada Seifun KK.) treated with silazane was added as a filler. A hydrogenated styrene-isoprene triblock copolymeric elastomer identical with that used in Example 1 was used in compounding ratios listed in Table 2. The same primer used in Example 1 was applied in the same manner, then the same paint used in Example 1 was applied in the same manner, followed by baking the paint layer at 120° C. for 60 minutes to evaluate various properties which were determined in the same manner used in Example 1. The results obtained are listed in Table 2.

EXAMPLE 7

The same procedures used in Example 5 were repeated except that magnesium sulfate whisker "MOS HIGE" (available from Ube Industries, Ltd.) was substituted for the talc used in Example 5 to evaluate various properties which were determined in the same manner used in Example 1. The results obtained are listed in Table 2.

COMPARATIVE EXAMPLES 3 TO 5

The same procedures used in Examples 4 to 6 were repeated except that the same amount of "SEPTON 2043" (MI 2.7 g/10 min; styrene content 13% by weight; available from Kuraray Co., Ltd.) was substituted for the hydrogenated styrene-isoprene triblock copolymeric elastomer used in Examples 4 to 6 to evaluate various properties which were determined in the same manner used in Example 4. The coating properties were inferior to those observed in Examples 4 to 6 and the mold shrinkage factor and linear expansion coefficient were greater than those observed on the samples of Examples 4 to 6 having the same talc content. The compounding ratios used and the results obtained in Comparative Examples are listed in Table 2.

COMPARATIVE EXAMPLE 6

The same procedures used in Example 5 were repeated except that the ethylene-propylene rubber used in Comparative Example 2 was substituted for the hydrogenated styrene-isoprene copolymer and that the resulting sample was pretreated by exposing to trichloroethane vapor for 60 seconds to etch the surface to evaluate various properties which were determined in the same manner used in Example 4. The coating properties were comparable to those observed in Example 5, but the mold shrinkage factor and linear expansion coefficient were greater than those observed on the sample of Example 5. The compounding ratios used and the results obtained in Comparative Examples are listed in Table 2.

COMPARATIVE EXAMPLE 7

The same procedures used in Example 5 were repeated except that ethylene-butene copolymeric elastomer "EBM2041P" (MI 30 g/10 min; butene content 18% by weight; available from Japan Synthetic Rubber Co., Ltd.) was substituted for the hydrogenated styrene-isoprene elastomeric triblock copolymer to evaluate various properties which were determined in the same manner used in Example 4. The coating properties and the impact strength as determined at −30° C. were inferior to those observed in Example 5 and the mold shrinkage factor and linear expansion coefficient were greater than those observed on the sample of Example 5 although an elastomer having the same melt index was used. The results obtained are listed in Table 3.

EXAMPLES 8 TO 10

The same procedures used in Example 4 were repeated except that a hydrogenated styrene-butadiene triblock copolymeric elastomer "TUFTEC H1031" (MI 40 g/10 min; styrene content 30% by weight; available from Asahi Chemical Industry Co., Ltd.) and ethylene-propylene block copolymer and talc identical to those used in Example 4 were used in compounding ratios as listed in Table 3 to determine various properties of the resulting samples which were determined in the same manner used in Example 4. The results obtained are summarized in Table 3.

COMPARATIVE EXAMPLE 8

The same procedures used in Example 9 were repeated except that a hydrogenated styrene-butadiene triblock copolymeric elastomer "Kraton G-1652" (MI 1.9 g/10 min; styrene content 29% by weight; available from Shell Chemical Co., Ltd.) was substituted for the hydrogenated styrene-butadiene triblock copolymeric elastomer used in Example 9 to determine various properties of the resulting samples which were determined in the same manner used in Example 4. The impact strength was comparable to that observed in Example 9, the resistance to gasoline was extremely low and the mold shrinkage factor and linear expansion coefficient were large. The compounding ratios used and the results obtained are summarized in Table 3. Furthermore, flow marks and jettings are formed on the surface of the molded articles (the flow marks and jettings are not formed in the Example 9) and the molded articles have low surface gloss.

COMPARATIVE EXAMPLE 9

The same procedures used in Example 8 were repeated except that 60% by weight of the hydrogenated styrene-butadiene triblock copolymeric elastomer used in Example 7, 30% by weight of a polypropylene and 10% by weight of talc were used to determine various properties of the resulting sample which were determined in the same manner used in Example 4. The impact strength was excellent, but the heat deformation temparature was low and the specimen accordingly caused deformation during baking the coated paint. Moreover, the amount of the elastomer used was great and, therefore, the resistance to gasoline was low. The compounding ratios used and the results obtained are summarized in Table 3.

TABLE 1

|  |  | Resin Composition (wt. %) | | | | |
| --- | --- | --- | --- | --- | --- | --- |
|  |  | Ex. 1 | Ex. 2 | Ex. 3 | Comp. Ex. 1 | Comp. Ex. 2 |
| Homopolypropylene | MI, 230° C., 2.16 kg/cm$^2$ (g/10 min) 4 | 75 | 65 | 60 | 100 | 75 |

TABLE 1-continued

|  |  | Resin Composition (wt. %) | | | | |
| --- | --- | --- | --- | --- | --- | --- |
|  |  | Ex. 1 | Ex. 2 | Ex. 3 | Comp. Ex. 1 | Comp. Ex. 2 |
| Hydrogenated styrene-isoprene triblock copolymeric elastomer "SEPTON 2002" |  | 30 | 25 | 35 | 40 |  |
| Ethylene-propylene copolymeric rubber |  | 3.5 |  |  |  | 25 |
|  | Unit |  |  |  |  |  |
| Izod impact strength 23°0 C. | kg. cm/cm | 50 | 60 | NB* | 8.0 | 42 |
| −30° C. |  | 10 | 20 | 30 | 2.0 | 6.5 |
| Mold shrinkage factor | /1000 | 12.5 | 10.1 | 8.0 | 16.0 | 14.1 |
| Linear expansion coef. | $\times 10^{-5}$ m/m °C. | 12.3 | 11.1 | 10.0 | 12.0 | 7.8 |
| Heat deformation temp. | °C. | 90 | 80 | 70 | 110 | 90 |
| Primer applied | Checkers peel test (rate of squares peeled off) | % | 0 | 0 | 0 | 100 | 20 |
|  | Peel strength of Film coated | (kg/cm) | 0.8 | 0.9 | 1.5 | >0.1 | 0.2 |
|  | Resistance to gasoline | min | 80 | 100 | >120 | 3 | 10 |
| Free of Primer | Checkers peel test (rate of squares peeled off) | % | 0 | 0 | 0 | 100 | 50 |
|  | Peel strength of Film coated | (kg/cm) | 0.6 | 0.7 | 1.2 | >0.1 | 0.15 |
|  | Resistance to gasoline | min | 35 | 45 | 50 | 2 | 7 |

TABLE 2

|  |  | Resin Composition (wt. %) | | | | | | | | |
| --- | --- | --- | --- | --- | --- | --- | --- | --- | --- | --- |
|  |  | Ex. 4 | Ex. 5 | Ex. 6 | Ex. 7 | Comp. Ex. 3 | Comp. Ex. 4 | Comp. Ex. 5 | Comp. Ex. 6 | Comp. Ex. 7 |
|  | MI, 230° C., 2.16 kg/cm² (g/10 min) |  |  |  |  |  |  |  |  |  |
| Homopolypropylene | 4 | 50 | 30 | 0 | 30 | 50 | 30 | 0 | 30 | 30 |
| Ethylene-propylene block copolymer | 8 | 15 | 25 | 50 | 25 | 15 | 25 | 50 | 25 | 25 |
| Hydrogenated styrene-isoprene triblock Copolymeric elastomer "SEPTON 2002" | 30 | 25 | 35 | 40 | 35 |  |  |  |  |  |
| Hydrogenated styrene-isoprene triblock Copolymeric elastomer "SEPTON 2034" | 2.7 |  |  |  |  | 25 | 35 | 40 |  |  |
| Ethylene propylene copolymeric rubber | 30 |  |  |  |  |  |  |  | 35 |  |
| Ethylene-butene copolymeric elastomer | 30 |  |  |  |  |  |  |  |  | 35 |
| Talc |  | 10 | 10 | 10 |  | 10 | 10 | 10 | 10 | 10 |
| Magnesium sulfate whisker |  |  |  |  | 10 |  |  |  |  |  |
|  | Unit |  |  |  |  |  |  |  |  |  |
| Izod impact strength 23° C. | kg. cm/cm | 40 | 45 | 50 | 48 | 45 | 50 | 60 | 48 | 30 |
| −30° C. |  | 5 | 7 | 10 | 9 | 6 | 9 | 14 | 8 | 3 |
| Mold shrinkage factor | /1000 | 9.9 | 8.2 | 7.0 | 7.8 | 10.8 | 9.3 | 7.9 | 8.9 | 8.6 |
| Linear expansion coef. | $\times 10^{-5}$ m/m °C. | 6.8 | 5.5 | 5.0 | 4.9 | 7.9 | 6.6 | 5.9 | 6.6 | 6.1 |
| Heat deformation temp. | °C. | 130 | 120 | 100 | 123 | 129 | 119 | 101 | 121 | 124 |
| Primer applied | Checkers peel test (rate of squares peeled off) | % | 0 | 0 | 0 | 0 | 2 | 0 | 0 | 0 | 10 |
|  | Peel strength of Film coated | (kg/cm) | 1.0 | 1.2 | 1.8 | 1.2 | 0.5 | 0.6 | 0.7 | 1.2 | 1.3 |
|  | Resistance to gasoline | min | 100 | >120 | 120 | >120 | 10 | 10 | 20 | >120 | 7 |
| Free of Primer | Checkers peel test (rate of squares peeled off) | % | 0 | 0 | 0 | 0 | 20 | 15 | 10 | 0 | 5 |
|  | Peel strength of Film coated | (kg/cm) | 0.8 | 0.9 | 1.5 | 0.9 | 0.1 | 0.2 | 0.2 | 0.8 | 0.6 |
|  | Resistance to gasoline | min | 45 | 55 | 80 | 60 | 2 | 2 | 7 | 50 | 15 |

TABLE 3

| | MI, 230° C., 2.16 kg/cm² (g/10 min) | Resin Composition (wt. %) | | | | |
|---|---|---|---|---|---|---|
| | | Ex. 8 | Ex. 9 | Ex. 10 | Comp. Ex. 8 | Comp. Ex. 9 |
| Ethylene-propylene block copolymer | 8 | 65 | 60 | 50 | 60 | 30 |
| Hydrogenated styrene-butadiene triblock Copolymeric elastomer "TUFTEC H1031" | 40 | 30 | 30 | 30 | | 60 |
| Hudrogenated styrene-butadiene triblock Copolymeric elastomer "Kraton G-1652" | 1.9 | | | | 30 | |
| Talc | | 5 | 10 | 20 | 10 | 10 |
| | Unit | | | | | |
| Izod impact strength 23° C. | kg. cm/cm | 50 | 40 | 35 | 50 | NB |
| −30° C. | | 9 | 6 | 5 | 8 | 50 |
| Mold shrinkage factor | /1000 | 8.0 | 5.4 | 4.6 | 7.0 | 3.8 |
| Linear expansion coef. | ×10⁻⁵ m/m °C. | 8.9 | 7.8 | 6.9 | 9.1 | 7.0 |
| Heat deformation temp. | °C. | 110 | 125 | 138 | 126 | 75 |
| Primer applied — Checkers peel test (rate of squares peeled off) | % | 0 | 0 | 0 | 10 | 0 |
| Peel strength of Film coated | (kg/cm) | 1.1 | 1.3 | 1.5 | 0.5 | 1.8 |
| Resistance to gasoline | min | 100 | >120 | >120 | 5 | 15 |
| Free of Primer — Checkers peel test rate of squares peeled off) | % | 0 | 0 | 0 | 40 | 0 |
| Peel strength of Film coated | (kg/cm) | 0.7 | 0.9 | 1.2 | 0.1 | 1.2 |
| Resistance to gasoline | min | 50 | 60 | 70 | 2 | 10 |

The present invention can provide a molded article having sufficient and practically acceptable adhesion to a coating layer subsequently applied thereto without subjecting any pretreatment such as an etching treatment with, for instance, trichloroethane vapor, a plasma treatment or a flame treatment which is an indispensable process for coating molded articles obtained from the conventional polypropylene resin compositions or further without using any primer layer. In other words, the method of the present invention does not use trichloroethane which would decompose ozone present in the upper layer of the atmosphere and, therefore, the method does not suffer from the problem of environmental pollution and/or disruption. Moreover, the method of the invention does not use any batchwise coating process such as a plasma treatment and thus makes it possible to reduce the amount of paints to be used and to reduce the expenses for coating. Further, the method does not require the use of a flame treatment and, therefore, the molded article may have any arbitrary shape and it can be coated without causing any damage. Moreover, the resulting molded article has low mold shrinkage factor and linear expansion coefficient. This allows the reduction of the amount of fillers to be incorporated and correspondingly the reduction of the weight of the article which in turn makes the weight of automobiles lighter.

We claim:

1. A resin composition which comprises 100 parts by weight of a polypropylene and 20 to 100 parts by weight of a hydrogenated styrene/butadiene or styrene/isoprene elastomeric block copolymer having a melt index of not less than 25 g/10 min as determined at a temperature of 230° C. and a load of 2.16 kg/cm².

2. The resin composition of claim 1 wherein it further comprises a filler in an amount of 2 to 35% by weight on the basis of a total weight of the resin composition.

3. A method for manufacturing a coated molded article which comprises the steps of molding a resin composition comprising 100 parts by weight of a polypropylene and 20 to 100 parts by weight of a hydrogenated styrene/butadiene of styrene/isoprene elastomeric block copolymer having a melt index of not less than 25 g/10 min as determined at a temperature of 230° C. and a load of 2.16 kg/cm² and then applying a coating directly onto the resulting molded article in the absence of etching with organic solvent(s) or plasma treatment(s) or flame treatment(s).

4. The method of claim 3 wherein the resin composition further comprises a filler in an amount of 2 to 35% by weight on the basis of a total weight of the resin composition.

5. The method of claim 3 wherein the molded article is coated with a paint after application of a primer layer.

6. The method of claim 3 wherein the styrene content of the hydrogenated styrene/butadiene or styrene/isoprene elastomeric block copolymer ranges from 10 to 40% by weight.

7. The method of claim 3 wherein the polypropylene is a homopolypropylene.

8. The method of claim 7 wherein an ethylene-propylene block copolymer is partially or entirely substituted for the homopolypropylene.

* * * * *